(12) United States Patent
Lacroix

(10) Patent No.: US 11,641,399 B2
(45) Date of Patent: May 2, 2023

(54) SMART SERVO MOTOR AND ACTUATOR ASSEMBLY USING A PLURALITY OF SMART SERVO MOTORS

(71) Applicant: RobotShop Japan Co., Ltd., Tokushima (JP)

(72) Inventor: Yves Lacroix, Tokushima (JP)

(73) Assignee: RobotShop Japan Co., Ltd., Tokushima (JP)

( * ) Notice: Subject to any disclaimer, the term of this patent is extended or adjusted under 35 U.S.C. 154(b) by 44 days.

(21) Appl. No.: 17/052,896

(22) PCT Filed: May 14, 2018

(86) PCT No.: PCT/JP2018/018548
§ 371 (c)(1),
(2) Date: Nov. 4, 2020

(87) PCT Pub. No.: WO2019/220504
PCT Pub. Date: Nov. 21, 2019

(65) Prior Publication Data
US 2021/0360069 A1   Nov. 18, 2021

(51) Int. Cl.
*H04L 67/12* (2022.01)
*G05B 19/4155* (2006.01)

(52) U.S. Cl.
CPC .......... *H04L 67/12* (2013.01); *G05B 19/4155* (2013.01); *G05B 2219/33221* (2013.01); *G05B 2219/42182* (2013.01)

(58) Field of Classification Search
CPC ...... G05B 19/0423; G05B 2219/33221; G05B 2219/42182; G05B 2219/21073; H02P 5/00; H04L 67/12; H02K 11/20
See application file for complete search history.

(56) References Cited

U.S. PATENT DOCUMENTS

| | | | |
|---|---|---|---|
| 5,452,419 A | 9/1995 | Di Giulio et al. | |
| 6,144,183 A | 11/2000 | Kawai | |

(Continued)

FOREIGN PATENT DOCUMENTS

| | | |
|---|---|---|
| JP | 2001-25294 A | 1/2001 |
| JP | 2008-22638 A | 1/2008 |

(Continued)

OTHER PUBLICATIONS

International Search Report and Written Opinion with English Translation of International Application No. PCT/JP2018/018548 dated Aug. 7, 2018; 7 pages.

(Continued)

*Primary Examiner* — Mohamed A. Wasel
*Assistant Examiner* — Linh T. Nguyen
(74) *Attorney, Agent, or Firm* — Crowell & Moring LLP

(57) ABSTRACT

Provided is a smart servo motor capable of allowing communication without using any unique ID and an actuator assembly using such smart servo motors. A main controller 11 is connected to a plurality of smart servo motors 1-1 . . . 1-N via a single communication path 13, where the main controller 11 can communicate with the individual smart servo motors using their unique IDs. Operating a selector of one smart servo motor 1-*u* permits communication between the smart servo motor 1-*u* and the main controller 11 with a special ID such as code "255". With this communication, the main controller 11 can retrieve the unique ID assigned to the smart servo motor 1-*u*.

10 Claims, 4 Drawing Sheets

(56) References Cited

U.S. PATENT DOCUMENTS

| | | | |
|---|---|---|---|
| 6,701,650 B1* | 3/2004 | Cieciuch | B66D 3/18 248/329 |
| 9,776,331 B2 | 10/2017 | Yu et al. | |
| 2002/0026270 A1* | 2/2002 | Kurishige | B62D 15/0245 180/443 |
| 2004/0066277 A1* | 4/2004 | Murray | G07C 9/00817 340/5.71 |
| 2005/0131645 A1* | 6/2005 | Panopoulos | G05D 1/0244 701/472 |
| 2005/0162014 A1* | 7/2005 | Morizaki | H04L 12/403 307/10.1 |
| 2006/0017550 A1* | 1/2006 | Yoshida | B60R 25/1018 340/426.11 |
| 2007/0120516 A1* | 5/2007 | Kurakake | G05B 19/4142 318/625 |
| 2009/0079372 A1 | 3/2009 | Takeuchi | |
| 2009/0128080 A1* | 5/2009 | Cheng | G05B 19/0423 318/625 |
| 2012/0056572 A1* | 3/2012 | Bigler | H02K 5/225 318/625 |
| 2013/0204461 A1* | 8/2013 | Kartes | B60J 7/085 701/2 |
| 2015/0102057 A1* | 4/2015 | Gehl | B67D 7/302 222/113 |
| 2017/0080568 A1* | 3/2017 | Yu | G05B 19/0423 |
| 2017/0239811 A1* | 8/2017 | Hardouin | B25J 9/08 |
| 2018/0200883 A1* | 7/2018 | Okazaki | H02P 29/0241 |
| 2019/0137531 A1* | 5/2019 | Zhu | B01L 9/06 |
| 2019/0166719 A1* | 5/2019 | Kaidu | G05B 15/02 |
| 2019/0192243 A1* | 6/2019 | Xu | A61B 34/25 |
| 2019/0193266 A1* | 6/2019 | Ishii | G05B 19/4155 |
| 2020/0206929 A1* | 7/2020 | Xiong | G05B 19/0428 |
| 2020/0310614 A1* | 10/2020 | Choi | G06F 3/147 |
| 2021/0384856 A1* | 12/2021 | Testolin | H02P 21/18 |

FOREIGN PATENT DOCUMENTS

| | | |
|---|---|---|
| JP | 2017-63590 A | 3/2017 |
| KR | 10-2012-0056324 A | 6/2012 |

OTHER PUBLICATIONS

Extended European Search Report for European Application No. 18918816.2 dated Sep. 10, 2021; 9 pages.

Anonymous: "Victor SP & Talon SRX Info Sheet" Jan. 8, 2016; pp. 1-4, https://web.archive.org/web/20160108015007if/http://www.ctr-electronics.com:80/downloads/Victor-SP-Talon-SRX-Info-Sheet.pdf; Retrieved from Internet on Sep. 1, 2021.

* cited by examiner

SMART SERVO MOTOR AND ACTUATOR ASSEMBLY USING A PLURALITY OF SMART SERVO MOTORS

RELATED APPLICATIONS

This application is a nationalization of International Application No. PCT/JP2018/018548, filed on May 14, 2020, the entirety of which is herein incorporated by reference.

FIELD OF THE DISCLOSURE

The present disclosure relates to a smart servo motor for producing rotary movement with pre-stored motion parameters, and also to an actuator assembly for driving devices including a robot, etc. with a plurality of such smart servo motors connected to a common control source in a network.

BACKGROUND OF THE INVENTION

Background of the Disclosure

Japanese Patent Application Publication No. 2017-63590 relates to a multi-axis control device using smart servo motors. This multi-axis control device allows a main controller to communicate with a plurality of smart servo motors via a single bus.

Japanese Patent Application Publication No. 2017-63590 describes the process of setting an identification code for smart servo motors. As described in the paragraph [0042] of Japanese Patent Application Publication No. 2017-63590, once an identification code setting command is received from a main controller, each smart servo motor goes into identification code setting mode. In the identification code setting mode, all the smart servo motors can be reset to a predetermined identification code, so that the identification code will be 0 (ID=0) for all the smart servo motors, as shown in FIG. 4A.

If the shaft of a first-stage smart servo motor is turned and its shaft rotation angle is determined to be larger than a preset value, the identification code of the first-stage smart servo motor can be changed to 1 (ID=1), as shown in FIG. 4B, and then a setting signal is sent to the other smart servo motors via the bus so that the identification code can be changed to 1 (ID=1) for all the smart servo motors, as shown in FIG. 4C.

Then, if the shaft of a second-stage smart servo motor is turned and its shaft rotation angle is determined to be larger than a preset value, the identification code of the second-stage smart servo motor can be changed to 2 (ID=2), as shown in FIG. 4D. Also in this case, a setting signal is sent to the other smart servo motors via the bus so that the identification code can be changed to 2 (ID=2) for third-stage and later smart servo motors, as shown in FIG. 4E. By repeating such a setting process, the identification code can be set in sequence for a plurality of smart servo motors.

SUMMARY OF THE DISCLOSURE

Problems to be Solved by the Disclosure

According to the identification code setting process for the multi-axis control device disclosed in Japanese Patent Application Publication No. 2017-63590, once the identification code setting mode is established, all the smart servo motors will be reset to a predetermined identification code.

In order to set the identification code anew for a smart servo motor, the resetting operation, i.e., the turning the shaft process has to be performed for all smart servo motors, which requires a lot of time and effort to set the identification code for all the smart servo motors.

In a device equipped with many smart servo motors, such as a robot, one or more smart servo motors may have to be checked for the identification code or motion parameters if the identification code is unknown for one of smart servo motors or a smart servo motor assigned with a given identification code is located at a wrong position. In this case, if the process disclosed in Japanese Patent Application Publication No. 2017-63590 is employed, the identification code has to be reset for all the smart servo motors.

Moreover, if the setting is unknown for one of smart servo motors, this smart servo motor has to be disconnected from the connection network, which requires a lot of effort.

The present disclosure is intended to solve the aforementioned problems of the related art and has an object to provide a smart servo motor and an actuator assembly using a plurality of such smart servo motors, which does not have to be disconnected from the network and which permits retrieval of the identification code by allowing communication between each separate smart servo motor and a main controller without the need for resetting other or all smart servo motors.

Means for Solving the Problems

The present disclosure provides a smart servo motor which includes a motor, a motor driver for driving the motor, a detector for detecting rotational position of the driving shaft, and a motor controller for controlling the motor driver with a detection output received from the detector, the smart servo motor is characterized by having a manually operable device, wherein a change in signal generated by the device permits the motor controller to establish a temporary communication mode using a special ID that is different from any ID assigned to individual smart servo motors.

Preferably, in the smart servo motor of the present disclosure, the special ID communication mode can be established within a predetermined period of time after the manually operable device operation.

In the smart servo motor of the present disclosure, the switching signal received from the device operation may permit transition not only to the "special ID communication mode" but also to a "manual setting mode".

Moreover, in the smart servo motor of the present disclosure, the manually operable device is preferably a push button, and varying the duration of pressing the push button may permit selection between the "special ID communication mode" or the "manual setting mode" which allows some control parameter settings via the button operation.

The present disclosure also describes an actuator assembly composed of a plurality of smart servo motors such as described in the aforementioned paragraphs, and a main controller, the assembly being characterized in that the main controller is capable of communicating with each of the smart servo motors, and when one of the smart servo motors is placed in the special ID communication mode, the main controller and the smart servo motor placed in the special ID communication mode communicate with each other using the special ID.

In the actuator assembly of the present disclosure, the main controller is connected to the smart servo motors, for example, in a daisy chain configuration as a single communication network.

In the actuator assembly of the present disclosure, the main controller may be capable of retrieving the previously set unique ID from the smart servo motor that is currently in the special ID communication mode.

Moreover, in the actuator assembly of the present disclosure, the main controller may be capable of instructing the smart servo motor placed in the special ID communication mode to change its motion parameters or set a new unique ID.

Effects of the Disclosure

A smart servo motor of the present disclosure can be accessed with the special ID, which is different from its uniquely assigned ID, by activating the button. Accessing the smart servo motor with the special ID allows the retrieval of its unique ID and/or the rewriting of its stored parameters.

In the actuator assembly where the main controller is capable of communicating with each of the smart servo motors, when a smart servo motor is placed in the special ID communication mode, the main controller can retrieve the unique ID from the targeted smart servo motor.

In the actuator assembly, any smart servo motor can be checked for the unique ID without the need of resetting the firmware of the main controller. Even if other smart servo motors are connected to the same circuit as the smart servo motor placed in the special ID communication mode, the smart servo motor placed in the special ID communication mode can be checked for its unique ID. Moreover, even if the unique IDs are not known for the smart servo motors connected to the circuit, any of the smart servo motors may be accessed with the special ID if that smart servo motor is put in the special ID communication mode, which then enables reading its unique ID, optionally assigning a new unique ID or setting motion parameters. Furthermore, even if a plurality of smart servo motors having the same unique ID are connected to the same circuit, it is possible to take various measures, e.g., changing the unique IDs for those conflicting smart servo motors.

METHOD FOR CARRYING OUT THE DISCLOSURE

Figure 1:
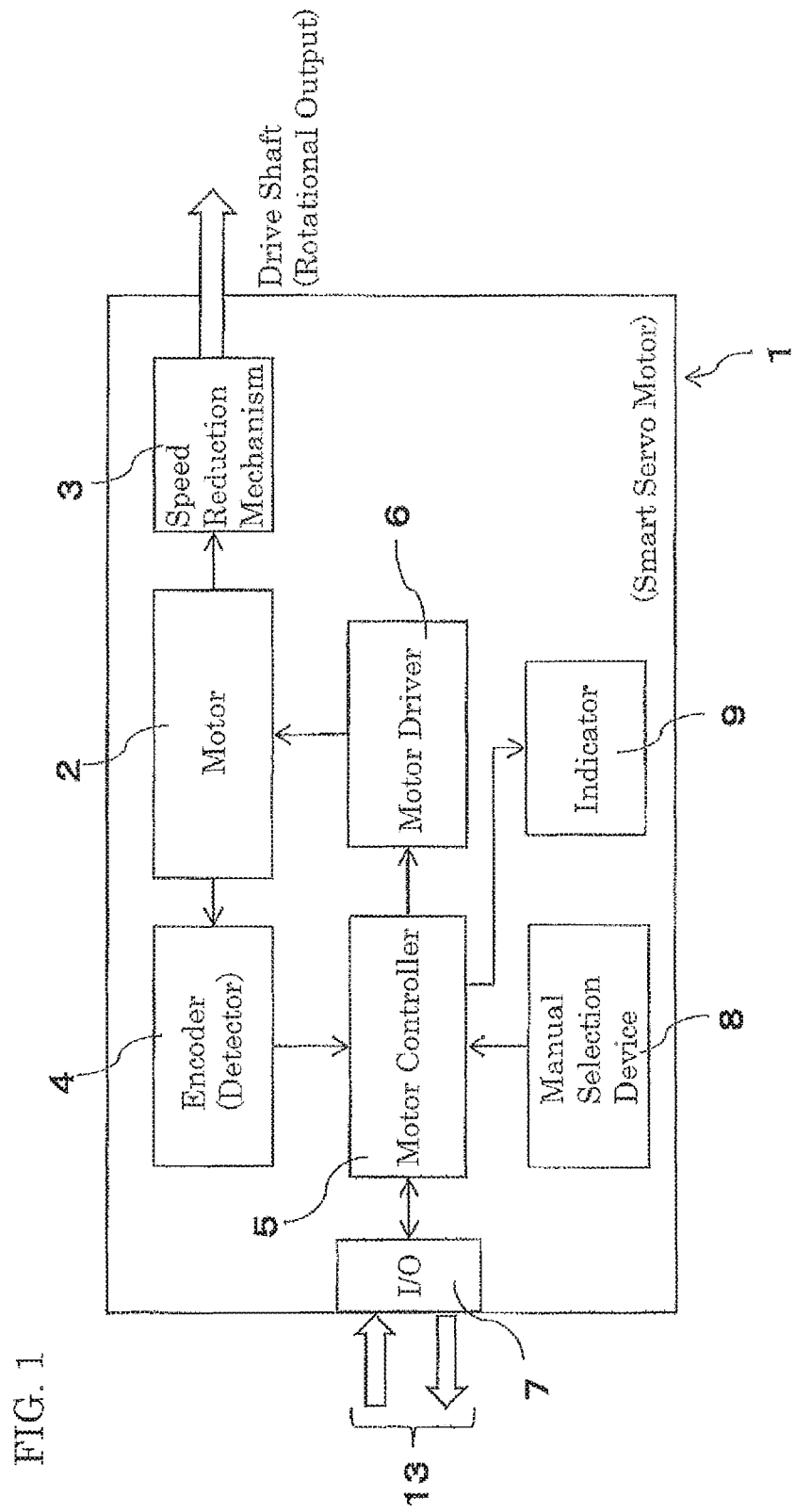
FIG. 1 is a circuit block diagram showing a smart servo motor according to an embodiment of the present disclosure.

FIG. 1 shows a smart servo motor 1 according to an embodiment of the present disclosure.

The smart servo motor 1 includes a motor 2. The motor 2 may be a DC motor. The motor 2 has a rotating shaft connected to a speed reduction mechanism 3 so that the rotation of the rotating shaft of the motor 2 can be slowed down and to drive a torque. An encoder 4 is connected to the driving shaft as an angle detector. The encoder 4 may use either optical detection or magnetic detection in order to determine the shaft rotation angle.

The smart servo motor 1 includes a motor controller 5, and the motor controller 5 controls a motor driver 6. The output from the encoder 4 can be transmitted to the motor controller 5. The motor controller 5 is mainly composed of an arithmetic logic unit and a memory, the memory storing motion parameters such as the current rotational angle, current rotation speed, and acceleration/deceleration rates. The arithmetic logic unit can output a driving pulse to the motor driver 6 in accordance with such motion parameters, with reference to the rotational output of the motor 2 that can be detected with the encoder 4. The motor driver 6 can supply the motor 2 with an average DC voltage output corresponding to the pulse width of the driving pulse.

The smart servo motor 1 includes an I/O device 7. A command signal, which can be supplied via a communication path 13 extending from a main controller 11 such as shown in FIG. 2, enters or exits via the I/O device 7.

The smart servo motor 1 includes a selector 8 and an indicator 9. In the smart servo motor 1 according to this embodiment, the selector 8 is composed of a push button and a mechanical switch that can be operated with the push button. Alternatively, the selector 8 may be a rotary switch or a touch switch capable of detecting change in capacitance, resistance, etc. A change in signal generated by the operation of the selector 8 can be detected by the motor controller 5. The indicator 9 may be composed of a plurality of LEDs that have different emission colors. The indicator 9 can emit light under instructions from the motor controller 5.

Figure 2:
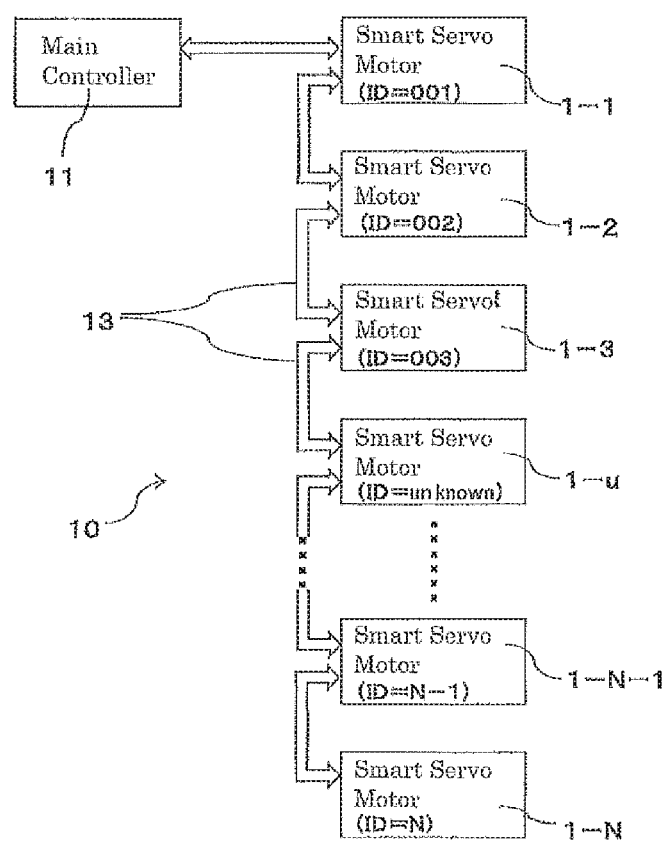
FIG. 2 is a circuit block diagram showing an actuator assembly with a main controller and a plurality of smart servo motors.

FIG. 2 shows an actuator assembly 10 according to an embodiment of the present disclosure. The actuator assembly 10 includes a plurality of smart servo motors 1, and the number of smart servo motors 1 used in FIG. 2 is N (N is an integer). Those smart servo motors 1 are denoted by 1-1, 1-2, 1-3, . . . 1-N-1, and 1-N. All the smart servo motors 1 have the same size and satisfy the same standards. However, it is also possible to incorporate a smart servo motor different in size and/or standards, as long as it can be controlled via the same communication path 13.

The actuator assembly 10 includes a main controller 11. The main controller 11 may be composed of a CPU and a memory. The main controller 11 and N smart servo motors 1 are connected together via a single communication bus 13. The connection configuration shown in FIG. 2 is a so-called daisy chain connection, where N smart servo motors 1 are connected in series on the communication bus 13 extending from the main controller 11. The main controller 11 outputs a command signal in accordance with an embedded program. Through the communication path 13, the command signal is supplied simultaneously to each motor controller 5 via the I/O 7 device of each smart servo motor 1.

Next, the operation of the smart servo motor 1 is described with reference to the flow chart shown in FIG. 3.

In the smart servo motor 1 shown in FIG. 1, the internal memory of the motor controller 5 stores a unique ID. The memory also stores motion parameters such as the rotational angle of drive shaft, rotational speed, and acceleration/deceleration rates. Through the communication path 13 shown in FIG. 2, power can be supplied from the main controller 11 to the I/O 7 of each smart servo motor 1, while a command signal can be transmitted from the main controller 11 to the targeted smart servo motor 1. In each motor controller 5, the ID contained in the command signal is compared with the unique ID assigned to the smart servo motor 1, and if they coincide with each other, the motor controller 5 accepts the command signal transmitted from the main controller 11. In response to the command signal, the motor controller 5 gives a driving pulse to the motor driver 6 in accordance with the pre-stored motion parameters, thereby driving the motor 2.

The main controller 11 is also permitted to gain access to one motor controller 5 with the unique ID and rewrite the motion parameters stored in the motor controller 5 of the smart servo motor 1.

By operating the selector 8 shown in FIG. 1, the communication procedure at the motor controller 5 of the smart servo motor 1 can be switched over to either "special ID communication mode" or "manual setting mode".

Figure 3:
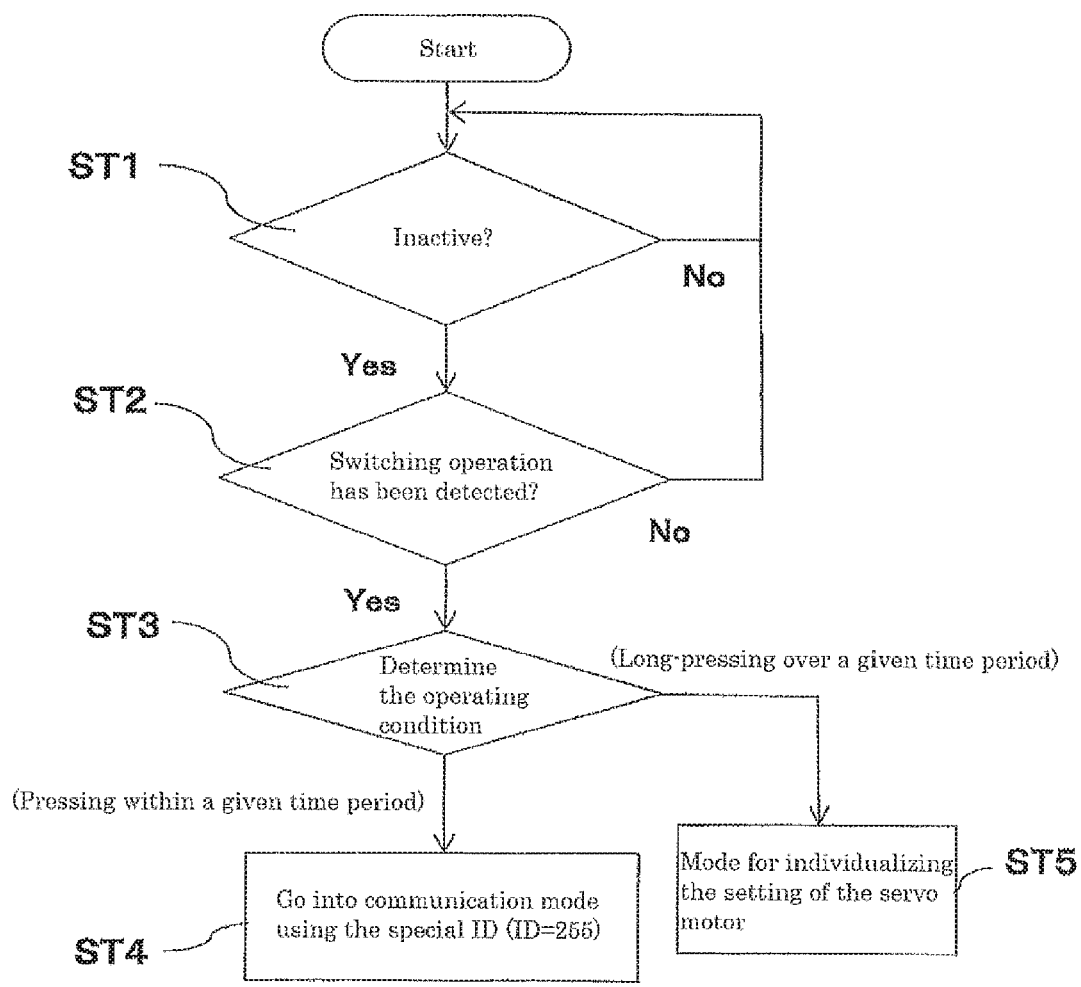
FIG. 3 is a flow chart showing a process for putting a smart servo motor into the special ID communication mode.

As shown in the flow chart of FIG. 3, if the motor 2 is available for communication at ST1 (Step 1) and the switch operation of the selector 8 is detected at ST2, it goes into ST3, where the motor controller 5 determines how the selector 8 was operated. If the operation is determined to be for "switching operation to special ID communication" at ST3, it goes into "special ID communication mode" of ST4. If the operation of the selector 8 is determined to be "switching operation for manual setting of the motor controller 5" at ST3, it goes into "manual setting mode" at ST5.

The selector 8 has a push button. For instance, "switching operation for permitting special ID communication" at ST3 may be selected by short-pressing, less than a second for example, while the "manual setting mode" could be selected via long-pressing, pressing and holding down the push button for more than 2 seconds. In short, either "special ID communication mode" or "manual setting mode" can be established depending on the pressing time of the push button.

The "Manual setting mode" of ST5 is a mode for setting operating conditions of individual smart servo motors 1 is necessary for when the control is not via communication networks such as the daisy chain shown in FIG. 2. For example the smart servo motor 1 may be controlled via analog pulse width modulation (PWM). For PWM driving of the smart servo motors 1, the rotational output of the motor 2 should have a particular angular range, for example, ±45 degrees, ±90 degrees, ±180 degrees, or ±360 degrees, for a given pulse width modulation range of the PWM driving signal. After "manual setting mode" of ST5 is established by pressing the push button of the selector 8, the push button may be pressed once more or a few times, whereby in the motor controller 5, the rotational output may have a particular angular range, for example, ±45 degrees, ±90 degrees, ±180 degrees, or ±360 degrees, depending on the number of times pressed. The indicator 9 could indicate the selection, for example by changing the number of LEDs to be illuminated or the color of light to be emitted from LEDs depending on the setting of the angular range.

However, when a network is established with the daisy chain connection shown in FIG. 2, manual setting is not necessary since the selecting may be made via a command. When the network is established, the main controller 11 can gain access to the individual smart servo motors 1-1, 1-2, . . . 1-N with the unique IDs assigned to these smart servo motors 1 so that the motion parameters stored in the motor controller 5 of each smart servo motor may be set from the main controller 11.

Moreover, when the "special ID communication mode" is established at ST4, the motor controller 5 is allowed to communicate with the main controller 11 not with the unique ID assigned to the smart servo motor 1 but with a "special ID." The "special ID" is a predefined ID different from the unique IDs assigned to the individual smart servo motors 1. The smart servo motor 1, placed in "special ID communication mode", and the main controller 11 can communicate with each other with this "special ID."

When the motor controller 5 is a 16-bit processor, for instance, "special ID" may be "255". This means that when "special ID communication mode" of ST4 is established, the main controller 11 and the smart servo motor 1 placed in "special ID communication mode" can communicate with each other not with the unique ID but with the ID "255", regardless of the value of the unique ID.

Once "special ID communication mode" is set using the button, it persists for a predetermined period of time. The duration of "special ID communication mode" should be set long enough to exchange data, e.g., send the unique ID from the smart servo motor 1 to the main controller 11, but should not be too long either. For example, the persistent duration may be for example "10 seconds." During "special ID communication mode," setting a predetermined number of LEDs could emit a predetermined color of light in the indicator 9 in order to give visible notification for the persistent duration of the mode. It should be noted that "special ID communication mode" can be canceled part way through the persistent duration by pressing the push button of the selector 8 once again.

Next the control procedure of the actuator assembly 10 shown in FIG. 2 will be described with references to the flow chart shown in FIG. 4.

In the actuator assembly 10, connected in a daisy chain configuration, each individual smart servo motor 1 is assigned its own unique ID. In the embodiment shown in FIG. 2, the unique ID of the smart servo motor 1-1 is "001", the unique ID of the smart servo motor 1-2 is "002", . . . the unique ID of the smart servo motor 1-N is "N".

Figure 4:
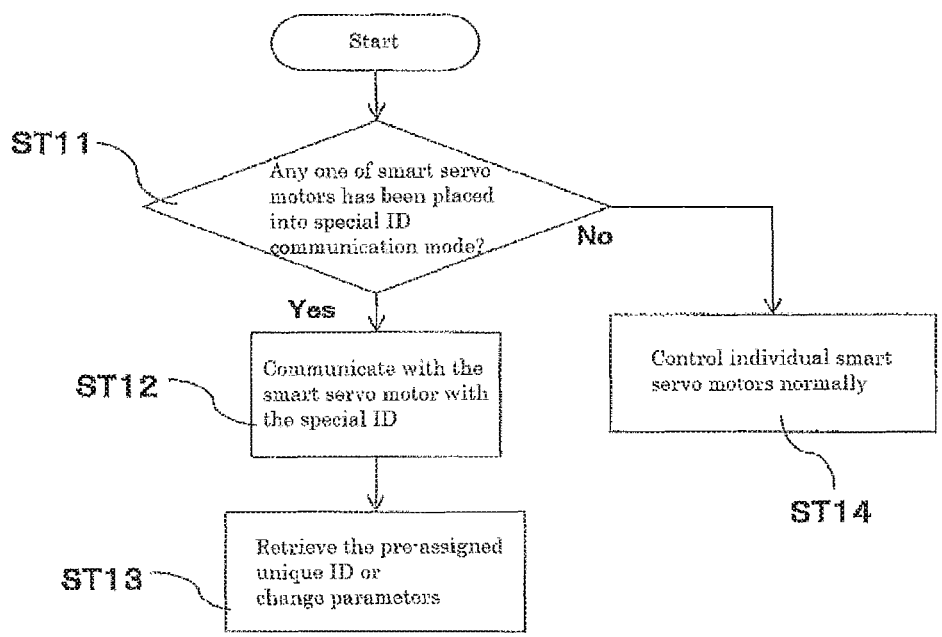
FIG. 4 is a flow chart showing a process for retrieving the unique ID from a smart servo motor in an actuator assembly.

When none of the smart servo motors 1 are placed in "special ID communication mode" at ST11 of the flow chart shown in FIG. 4, each smart servo motor 1 is considered in normal control mode in ST14. During the normal control mode in ST14, a command signal containing a unique ID and a motion command is supplied from the main controller 11, through the single communication path (bus) 13, to all the smart servo motors 1. At the motor controller 5 of each smart servo motor 1, the unique ID contained in the command signal is compared with the assigned unique ID. If IDs are the same that smart servo motor 1 decodes the motion command following the unique ID in the command signal to control its motor driver 6 and drive its motor 2 in accordance with the motion parameters stored in its motor controller 5.

When the actuator assembly 10 shown in FIG. 2 is built into a robot or other device, it make motions corresponding to the rotational angle and rotational speed of the rotational output obtained from the individual smart servo motors 1.

When at least one of the smart servo motors 1 shown in FIG. 2 is placed into "special ID communication mode," the main controller 11 goes into ST12. "Special ID communication mode" can be established using the push button of the selector 8 in one of the smart servo motors 1 as needed. For example, if the need to check the unique ID of a particular smart servo motor 1-$u$ among the smart servo motors shown in FIG. 2 occurs, the smart servo motor 1-$u$ can be placed into "special ID communication mode" using the push button of the selector 8.

If the smart servo motor 1-$u$ is placed in "special ID communication mode" at ST11, the communication with the special ID, e.g., the use of ID "255" is permitted between the main controller 11 and the smart servo motor 1-$u$. The connection is possible within 10 seconds of using the button, beyond which the smart servo motor 1 returns to its normal mode. If the connection is established within the 10 seconds the "special ID communication mode" may continue. With this communication, the unique ID assigned to the smart servo motor 1-$u$ can be retrieved and checked by the main controller 11. Similarly, the other motion parameters stored in the motor controller 5 of the smart servo motor 1-*u* can be retrieved and checked by the main controller 11.

Accordingly, in a robot or other device with a number of smart servo motors 1 built into it does not operate as expected, due possibly to a smart servo motor 1 unique ID issue or conflict, it can be checked rapidly and without affecting the other smart servo motors 1 in the assembly.

Moreover, when the unique ID and possibly the motion parameters for any one of the smart servo motors 1 are unknown, that smart servo motor 1 does not need to be separated from the communication network; merely operating the selector 8 of the smart servo motor 1 to put the smart servo motor 1 into "special ID communication mode" enables checking the unique ID of the smart servo motor 1 and checking the motion parameter setting of the smart servo motor 1 if required.

Further uses of this disclosure may be imagined, such as a method for manually selecting a plurality of smart servo motors 1, such that they can be accessed at the same time by putting them into "special ID communication mode" in order to simultaneously set some parameters. For instance, when the motion parameters should be changed into the same value for a plurality of smart servo motors 1 with the unique IDs, e.g., "004," "008," "009," etc., pressing the push button of the selector 8 to put the targeted smart servo motors 1 into "special ID communication mode" enables changing the motion parameters at once for the targeted smart servo motors 1.

Although the actuator assembly shown in FIG. 2 has a so-called daisy chain connection, where the main controller 11 and the smart servo motors are connected together via the single communication path 13, the actuator assembly according to the present disclosure may have a different connection configuration. Yet if it includes smart servo motors according to the embodiment, where a unique ID is necessary for communication between controller and smart servo motors, then a smart servo motor may be put into "special ID communication mode" so that it could also be accessed without use of its unique ID.

LIST OF REFERENCE NUMERALS

1 Smart Servo Motor
2 Motor
3 Speed Reduction Mechanism
4 Encoder (Detector)
5 Motor Controller
6 Motor Driver
7 I/O
8 Selector
9 Indicator
10 Actuator Network
11 Main Controller
13 Communication Path

The invention claimed is:

1. An actuator assembly comprising:
a plurality of smart servo motors and a main controller, each of the smart servo motors comprising:
a motor;
a motor driver for driving the motor;
a detector for detecting rotation of a driving shaft;
a motor controller for controlling the motor driver with a detection output received from the detector; and,
a manually operable selector device;
wherein the manually operable selector device of each of the smart servo motors has a push button, rotary switch or touch switch and is capable of being operated independently from other manually operable selector devices of other smart servo motors by manually operating the push button, rotary switch or touch switch;
wherein the motor controller of each of the smart servo motors is capable of establishing a special ID communication mode on detecting a change in signal generated by manually operating the push button, rotary switch or touch switch;
wherein the main controller is capable of not only communicating with each of the smart servo motors using different unique IDs respectively assigned to individual smart servo motors, but also communicating with all the smart servo motors using a special ID instead of the unique ID assigned thereto, the special ID being a predefined ID different from any unique ID; and,
wherein when at least one of the smart servo motors is placed in the special ID communication mode by manually operating the push button, rotary switch or touch switch, the main controller communicates only with said at least one of the smart servo motors placed in the special ID communication mode using the special ID instead of the unique ID assigned thereto, whereby the main controller becomes capable of retrieving the unique ID from said at least one of the smart servo motors placed in the special ID communication mode.

2. The actuator assembly of claim 1, wherein the main controller is connected to the smart servo motors in a daisy chain configuration with a single communication path.

3. The actuator assembly of claim 1, wherein the main controller is capable of checking the motion parameter of the smart servo motor placed in the special ID communication mode.

4. The actuator assembly of claim 1, wherein the main controller is capable of changing the parameters of the smart servo motor placed in the special ID communication mode.

5. The actuator assembly of claim 1, wherein the special ID communication mode can be established within a predetermined period of time after the manual selector device operation.

6. The actuator assembly of claim 1, wherein the switching signal received from the selector device permits transition not only to the special ID communication mode but also to a manual setting mode which allows some control parameter setting of the motor controller via the selector device operation.

7. The actuator assembly of claim 6, wherein varying the duration of pressing the push button permits selection between the special ID communication mode and the manual setting mode.

8. The actuator assembly of claim 5, wherein each of the smart servo motors further comprises an indicator having LEDs, wherein during the predetermined period of time, a predetermined number of LEDs emit a predetermined color of light.

9. The actuator assembly of claim 1, wherein the motor controller is a 16-bit processor, wherein the special ID is "255".

10. The actuator assembly of claim 1, wherein the plurality of smart servo motors are built into a robot, wherein the robot is capable of making motions corresponding to the rotational angle and rotational speed of the rotational output obtained from individual smart servo motor.

* * * * *